Figure 1:
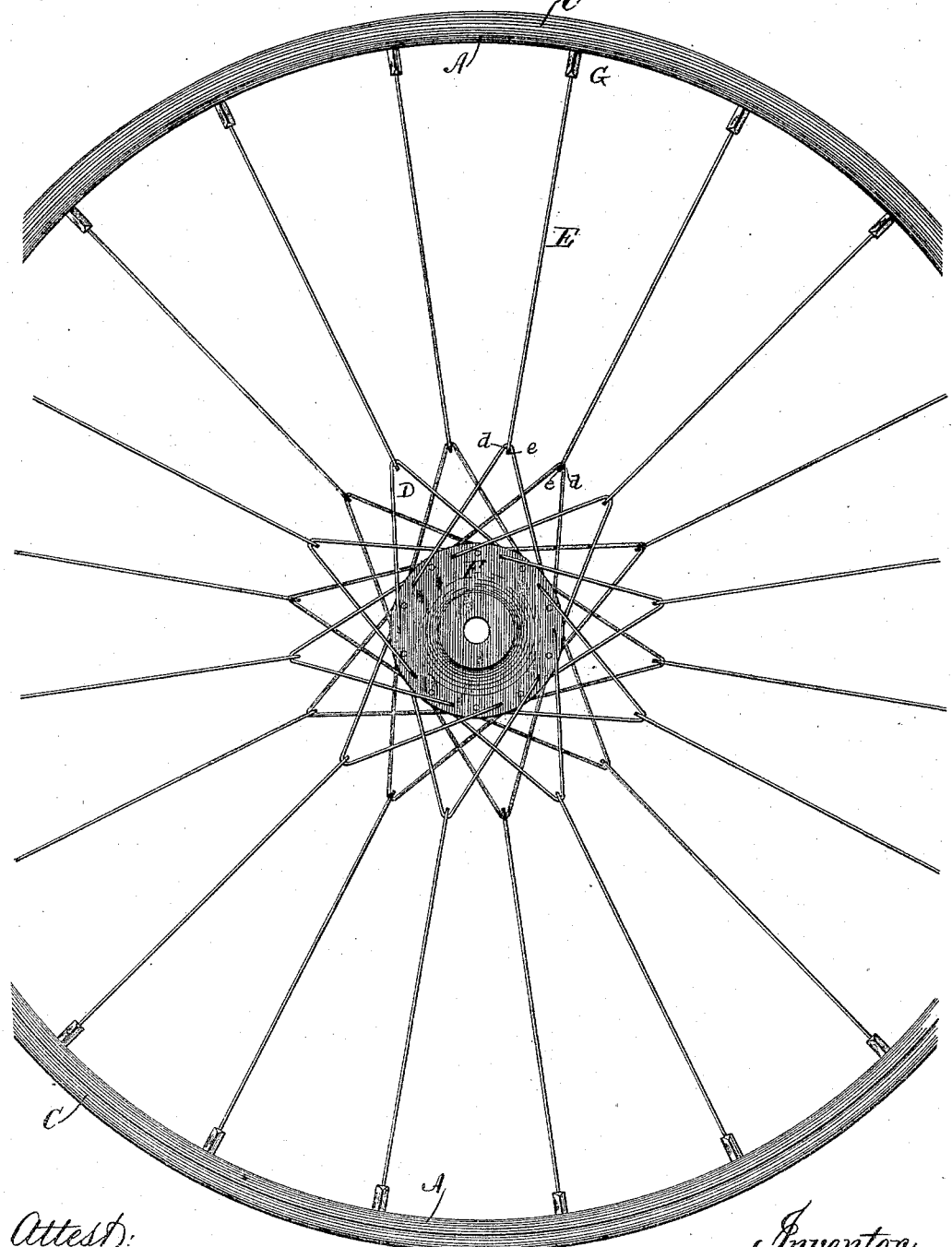

(No Model.)    2 Sheets—Sheet 1.

C. A. HARTMANN.
BICYCLE WHEEL.

No. 456,815.    Patented July 28, 1891.

Attest:
Geo. T. Smallwood.
F. H. Espey.

Inventor:
Charles A. Hartmann
by Edw. F. Simpson, Jr.
Attorney (No Model.)  C. A. HARTMANN.  2 Sheets—Sheet 2.
BICYCLE WHEEL.
No. 456,815.  Patented July 28, 1891.
FIG. 2
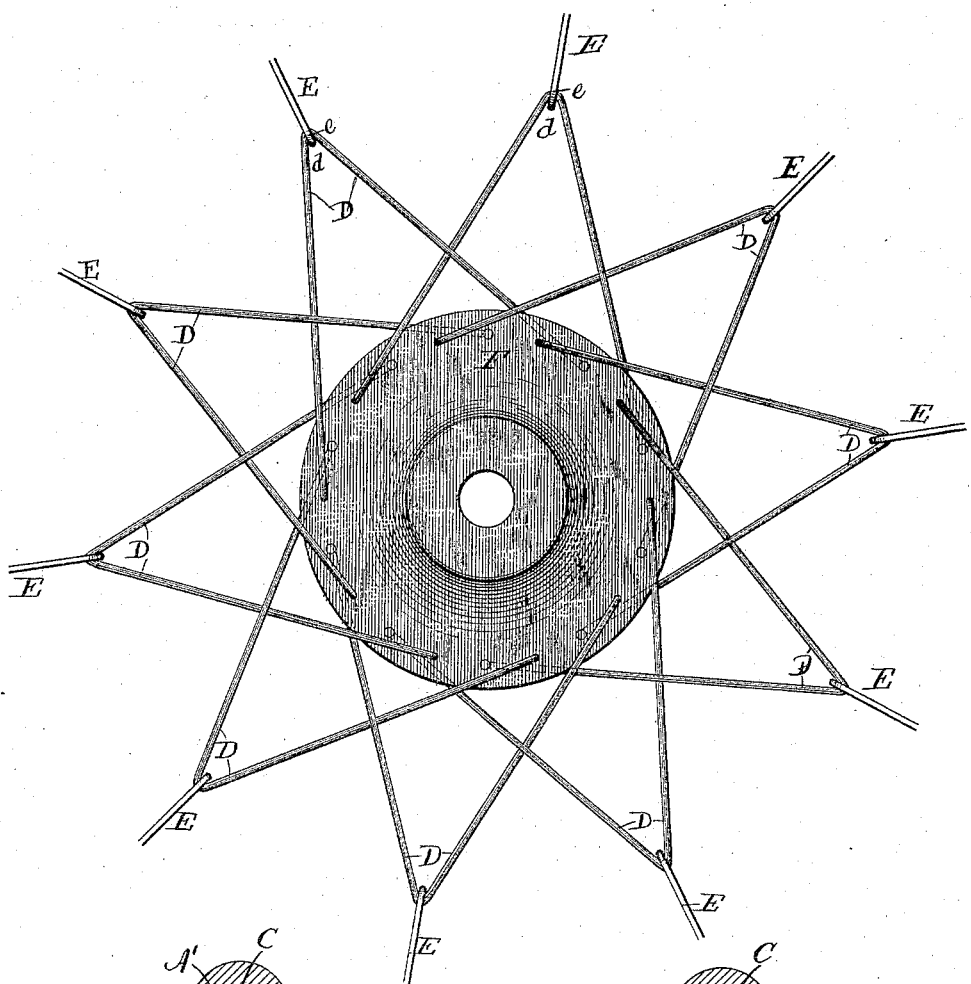
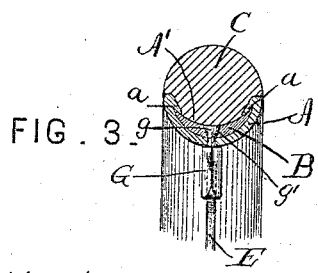
FIG. 3.
FIG. 5.
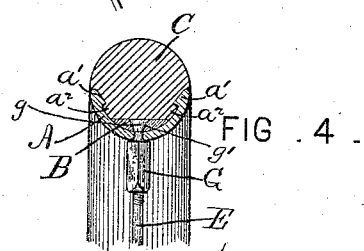
FIG. 4.
Attest:
Geo. T. Smallwood.
F. H. Espey
Inventor:
Charles A. Hartmann
by Edw. F. Simpson, Jr.
Attorney

UNITED STATES PATENT OFFICE.

CHARLES A. HARTMANN, OF WASHINGTON, DISTRICT OF COLUMBIA.

BICYCLE-WHEEL.

SPECIFICATION forming part of Letters Patent No. 456,815, dated July 28, 1891.

Application filed April 25, 1891. Serial No. 390,465. (No model.)

*To all whom it may concern:*

Be it known that I, CHARLES A. HARTMANN, of the city of Washington, in the District of Columbia, have invented certain new and useful Improvements in Bicycle-Wheels, of which the following is a specification.

My invention relates to that class of wheels having flanged hubs, wire spokes, metal fellies, and rubber tires, and which are adapted for use upon bicycles, tricycles, and other vehicles requiring light and durable wheels.

My objects, mainly, are to construct a wheel which shall possess both lightness and strength, and the parts of which are susceptible of being readily taken apart and put together again.

In the accompanying drawings, Figure 1 is a side view in elevation of a wheel constructed in accordance with my invention. Fig. 2 is a side view in elevation, on an enlarged scale, showing one of the hub-flanges and a single set of the interlaced forked spoke-pieces, the straight spoke-pieces being shown as broken off close to the forked spoke-pieces. Fig. 3 is a view in cross-section of the improved felly or rim and rubber tire, and Fig. 4 a similar view showing a modification thereof. Fig. 5 is a detail view showing one of the connections between the spoke-sections.

The rim or felly of my improved wheel is composed of two parts, the transversely-curved main or body portion A and the auxiliary strengthening hoop or band B, the strengthening-band fitting closely upon the body portion and being partly embraced by the flanged edges $a$ thereof. The strengthening-band may be either curved in cross-section to correspond with the curvature of the body portion, as shown in Fig. 3, or it may be flat on top and curved on its under side or that side next the body portion, as shown in Fig. 4. The edges of both the body portion and the band, or the edges of the band alone, may be chamfered in order to provide a neat joint between the parts, and also provide a smooth and unobstructed groove A' for the usually-employed rubber tire C. Instead, however, of turning the edges of the body portion over and upon the band and thus providing a smooth groove for the tire, said edges may be thickened or flanged into shoulders $a'$ $a'$ to form recesses $a^2$ $a^2$ between the shoulders and the strengthening-band to provide for more securely holding the rubber tire C, which, when placed in the felly-groove A', is forced into the groove-recesses, as shown in Fig. 4. The manner of constructing this compound rim is preferably by first shrinking the strengthening-band upon the body portion, then turning the edges of the body portion, which portion is wider than the band, over and upon the band, or, as in the modification shown in Fig. 4, thickening or flanging the edges to form the tire-retaining groove-recesses $a^2$ $a^2$, and in finally giving the desired transverse curve to the compound rim in suitable well-known way. By this construction an exceedingly stiff and durable wheel-rim is produced, capable of bearing great strain without flexing or bending, and which is adapted to afford firm bearings for the spoke nipples or thimbles hereinafter referred to.

The spokes of the wheel consist of bent or forked sections D and straight sections E. The forked spoke sections or pieces D are of V-shape form, and the arms or members of each fork are secured by riveting or other suitable way to opposite sides of one of the two flanges F on opposite sides of the hub, the forks being arranged around the flange and interlacing with each other, as shown. It will be seen that the members of the forks extend tangentially to the axle of the wheel and that each member is laced with the adjacent members of the two forks nearest to it, lapping under one member and over the other. By thus interlacing the forked spoke-sections the spokes are locked together and securely braced and constitute a substantially solid and rigid circle of spokes, each spoke contributing to strengthen the whole. Obviously, the forked spoke-sections may extend only a short distance from the hub-flange, the straight spoke-sections being employed to connect the outer or loop ends of the forked sections to the rim of the wheel, as shown, or said forked sections may be extended all the way to the rim of the wheel, to which they may be fastened in any suitable way, the straight spokes in this instance being dispensed with.

The outer or straight spoke sections or pieces E are detachably connected to the forked spoke-sections and adjustably and detachably connected to the rim. Any suitable means may be employed for making these connections, but I prefer to use the following: The inner ends of the straight spoke-sections are provided with hooks e, adapting the sections to be readily engaged with the outer or loop ends d of the forked sections, while the outer ends of the straight sections are threaded for insertion in threaded nipples or thimbles G, pivoted in the rim. The nipples are provided with beveled studs g, fitted to turn and prevented from endwise movement in beveled holes g', passing through the body portion and strengthening-band of the rim or felly. The double thickness of the rim affords a firm bearing for the nipples, which are subjected to considerable strain.

In putting the wheel together the straight spoke-pieces are connected to the forked pieces and then the threaded ends of the straight pieces are inserted in the nipples, after which the nipples are turned to tighten the spokes to any desired degree. To remove one or more of the straight spokes it is only necessary to adjust the nipple until the hook end of the straight spokes becomes disengaged from the forked piece, when the straight spoke may be readily removed.

It will be understood, of course, that the hub is provided with two flanges, as usual, and that the spokes of one flange alternate with those of the opposite flange in order to equally distribute the strain the wheel is caused to bear.

The advantages of my improvements are apparent, the construction being such that the straight spoke-sections are rendered readily detachable for the purpose of replacing bent or worn-out ones, or for replacing a damaged or worn-out hub without injury to other parts of the wheel. It will further be seen that by making the rim or felly of two parts and interlacing the forked spoke-pieces the wheel is made so strong that the number of spokes commonly employed for bicycle-wheels may be greatly reduced, only one-half the number being required, and that the forked spoke-sections may be made of cheaper material than the straight spoke-pieces, or they may be made of less diameter than the straight spoke-pieces, thus simplifying the construction of the wheel and greatly reducing the cost thereof.

I claim as my invention—

1. The combination, in a bicycle-wheel, of the rim composed of the transversely-curved body portion and the strengthening-band fitting closely thereon, the flexible tire surrounding the rim, the flanged hub, the interlaced forked spoke-pieces connected to the hub-flanges, the straight spoke-pieces detachably connected to the forked spoke-pieces and adjustably and detachably connected to the rim, substantially as described.

2. The combination, in a bicycle-wheel, of the flanged hub, the interlaced forked spoke-pieces connected to the hub-flanges, the straight spoke-pieces detachably connected to the forked spoke-pieces, and the rim to which the straight spoke-pieces are adjustably and detachably connected, substantially as described.

3. The combination, in a bicycle-wheel, of the forked spoke-pieces interlacing with each other and the members of each fork connected to the hub-flange of the wheel on opposite sides of the flange, and the straight spoke-pieces connected to the forked spoke-pieces and to the rim of the wheel, substantially as shown and described.

4. The combination, in a bicycle-wheel, of the forked spokes interlacing with each other, the members of each spoke being connected to the hub-flange of the wheel on opposite sides of the flange, and the connections between the outer ends of the spokes and the rim of the wheel, substantially as described.

5. The combination, in a wheel-rim, of the transversely-curved body portion, the strengthening-band fitting closely upon the body portion, the tire-groove, the tire-retaining-groove recesses formed by shoulders on the edges of the body portion and the bottom of the tire-groove, and the flexible tire closely fitting in said groove and grooved recesses, substantially as described.

In testimony whereof I have hereunto subscribed my name.

CHARLES A. HARTMANN.

Witnesses:
    EDW. F. SIMPSON, Jr.,
    C. WEAVER.

Correction in Letters Patent No. 456,815.

It is hereby certified that in Letters Patent No. 456,815, granted July 28, 1891, upon the application of Charles A. Hartmann, of Washington, D. C., for an improvement in "Bicycle-Wheels," an error appears in the printed specification requiring correction, as follows: In line 102, page 2, the words "grooved recesses" should read *groove-recesses*, and that the said Letters Patent should be read with this correction therein that the same may conform to the record of the case in the Patent Office.

Signed, countersigned, and sealed this 11th day of August, A. D. 1891.

[SEAL]

CYRUS BUSSEY,
*Assistant Secretary of the Interior.*

Countersigned:
   W. E. SIMONDS,
      *Commissioner of Patents.*